March 21, 1933.  C. E. JOHNSON  1,901,909
AGRICULTURAL IMPLEMENT
Filed Oct. 12, 1928  3 Sheets-Sheet 1

March 21, 1933.  C. E. JOHNSON  1,901,909
AGRICULTURAL IMPLEMENT
Filed Oct. 12, 1928  3 Sheets-Sheet 3

Inventor:
Christian E. Johnson
By Brown, Jackson, Boettcher & Denner
Attorneys

Witness
Milton Lenoir

Patented Mar. 21, 1933

1,901,909

UNITED STATES PATENT OFFICE

CHRISTIAN E. JOHNSON, OF MOLINE, ILLINOIS, ASSIGNOR TO DEERE & COMPANY, OF MOLINE, ILLINOIS, A CORPORATION OF ILLINOIS

AGRICULTURAL IMPLEMENT

Application filed October 12, 1928. Serial No. 312,001.

The present invention relates, generally, to agricultural implements and particularly to rotary rod weeders, wherein a long revolving rod is drawn transversely through the soil below the surface thereof for uprooting the weeds or breaking the same from their roots.

One of the principal objects of the invention is to provide improved mechanism for lifting and lowering the rotary rod, such mechanism being employed to raise the rod out of the ground, to lower it into the ground, and to adjust the depth of penetration of the rod below the surface of the soil. The rod is ordinarily quite long and, in the prior machines with which I am familiar, the vertical movement of the rod and particularly the raising of the same out of the ground has necessitated great exertion on the part of the operator. This is avoided in the present construction by the provision of a novel arrangement of worm gear mechanism, through which the operator can easily effect vertical adjustment between the implement frame and its rear supporting wheels for raising or lowering the rotary rod.

Another object of the invention is to provide an improved arrangement of draft connections for the implement, whereby the draft forces are applied most effectively for holding the rod down in the ground when in operation and for maintaining effective traction of the traction wheel which drives the rotary rod.

Another object is to provide an improved mounting for vertically swinging the wheel or wheels which raise and lower the implement frame and rotary rod, and to provide improved means for yieldingly resisting or limiting the lateral swinging movement of such wheels, which, in the preferred construction, consist of caster wheels. The latter feature of providing improved means for yieldingly resisting lateral swinging movement of the caster wheels prevents said wheels from swinging around to an obstructing position when the wheels are lifted entirely off the ground for imposing additional weight on the rotary rod.

Other objects and advantages of the invention will be apparent from the following description of a preferred embodiment thereof. In the accompanying drawings, illustrating such embodiment:

Figure 5 is a detail sectional view, taken on the plane of the line 5—5 of Figure 3.

Figure 1:
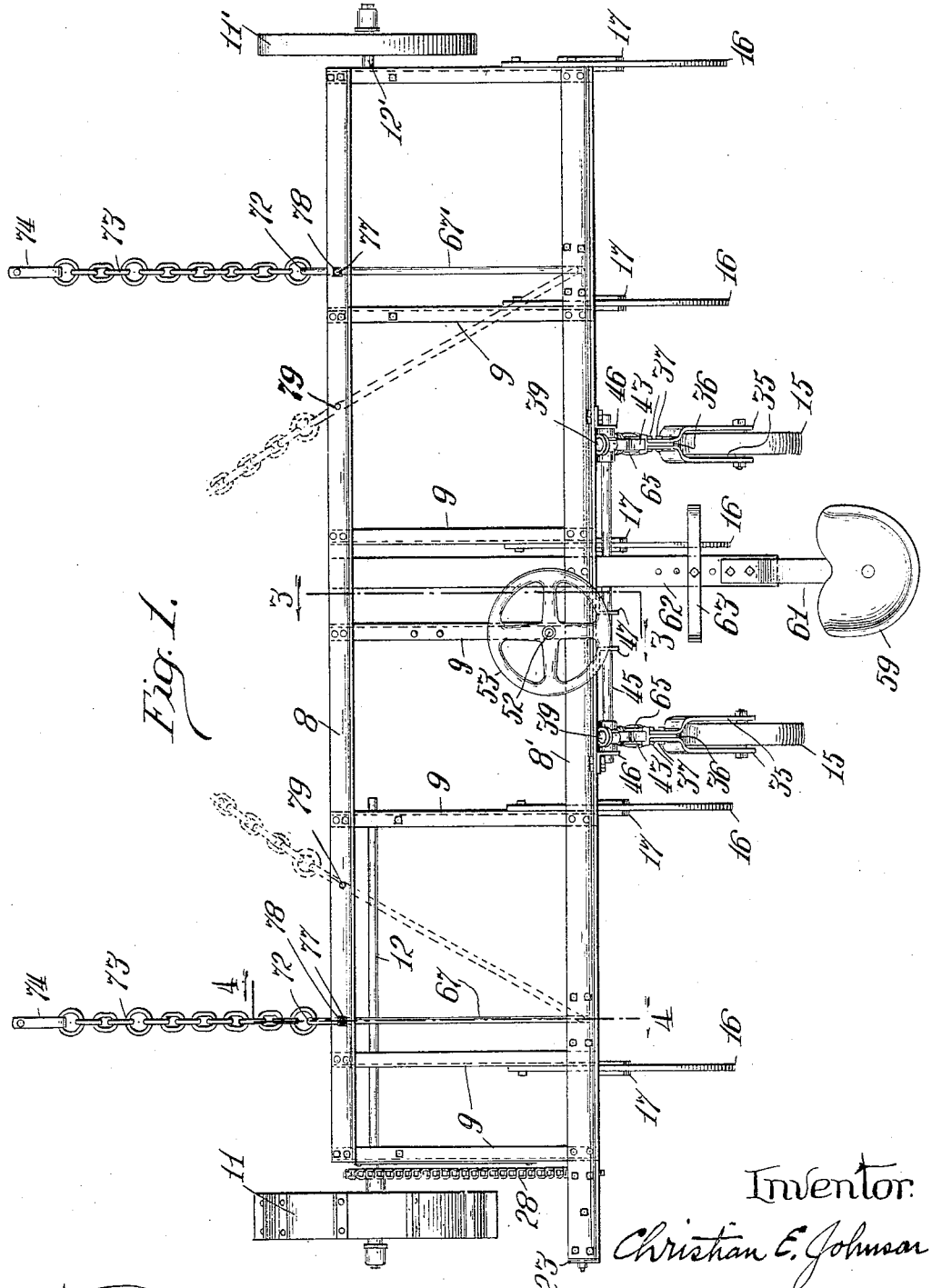
Figure 1 is a plan view of the weeder.

The frame of the implement comprises two transversely extending angle bars 8 and 8', which are cross connected at spaced points by longitudinally extending angle bars 9, which are riveted or bolted to the under sides of the transverse frame bars. The forward portion of the frame is supported on two laterally spaced wheels 11 and 11', which are mounted on stub axles or shafts 12 and 12' projecting outwardly from the sides of the frame. The wheel 11 serves as a traction wheel for driving the rotary rod, the tread thereof having any suitable traction lugs or cleats mounted thereon, and the shaft 12 on which the wheel is mounted is extended inwardly below the frame to to have mounting support in two or more brackets 14, which are secured to the under sides of the longitudinal frame bars 9. The stub-axle 12' for the other wheel 11' may have any suitable mounting on the opposite side of the frame. The rear portion of the frame is supported on one or two caster wheels 15, through which the frame and rotary rod are raised and lowered, as will be presently described.

Rigidly secured to the longitudinal bars 9 in spaced relation across the width of the frame is a series of bars 16 extending rearwardly from the frame and curved downwardly and forwardly in goose-neck formation.

The lower ends of said bars are adapted to carry the rotary rod down into the ground, and are provided with shoe-like bearing housings 17 in which the rotary rod 18 has bearing support. The rod extends across substantially the entire width of the machine and is arranged to be driven from the traction wheel 11, preferably through mechanism of the construction illustrated in Figure 2. Such power transmission mechanism comprises a laterally extending inclined shaft 19 which is coupled with the rotary rod 18, through a universal joint 21. The upper end of said shaft is mounted in a bearing 22, which is carried on one leg of an inverted U-shaped bearing frame 23 which is secured in depending relation to the rear frame bar 8' directly in rear of the traction wheel 11. A bevel gear 24 on the shaft 19 meshes with a mating bevel gear 25 mounted on a shaft 26, which has bearing support between the sides of the bearing frame 23. A sprocket wheel 27, mounted on the shaft 26, has a sprocket chain 28 passing around the same, said chain also passing over a large sprocket wheel 29, which is mounted on the inner end of the hub of the traction wheel 11. Thus, the traction power of the wheel 11 is transmitted through the counter shaft 26 and inclined shaft 19 to the rotary rod 18. The two bevel gears 24 and 25 reverse the direction of rotation, so that the forward side of the rotary rod 18 is turning upwardly with the forward movement of the implement, such direction of rotation of the rod being most effective for uprooting the weeds.

Figure 3:
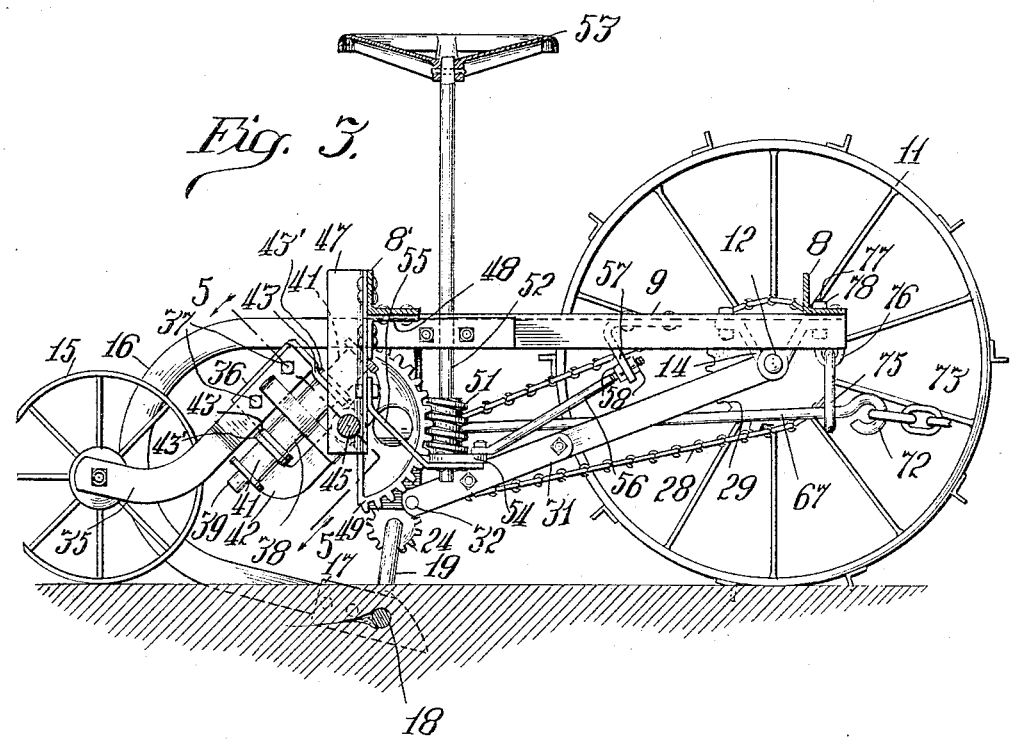
Figure 3 is a longitudinal sectional view through the implement, taken approximately on the plane of the line 3—3 of Figure 1.
Figure 4:
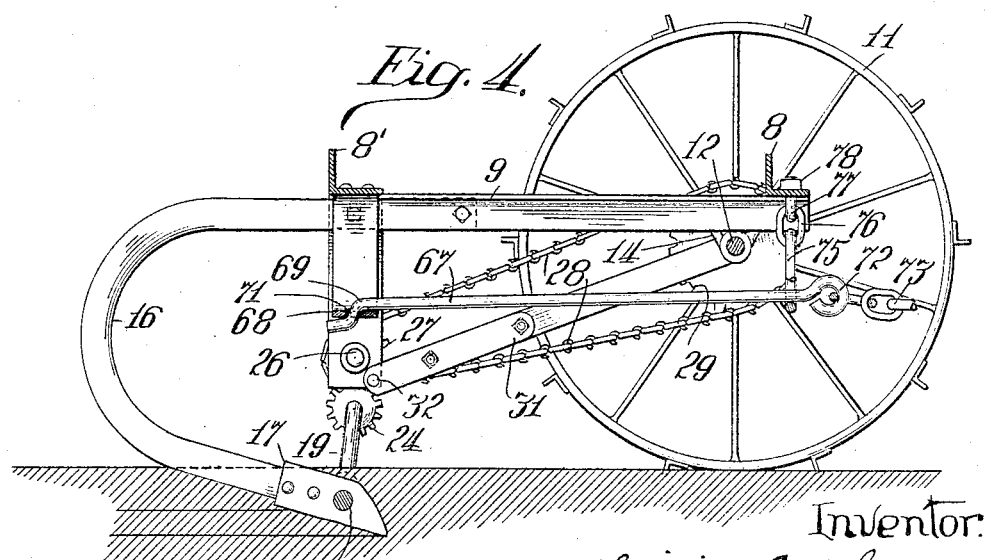
Figure 4 is a similar sectional view, taken approximately on the plane of the line 4—4 of Figure 1.

Referring to Figures 3 and 4, it will be seen that the lower end of the bearing frame 23 has braced connection with the forward portion of the main frame through a bracing structure 31. This may consist of one or more bars having a forward point of support on the axle shaft 12 and connected to the lower end of the bearing frame at one or both sides, as indicated at 32.

Figure 2:
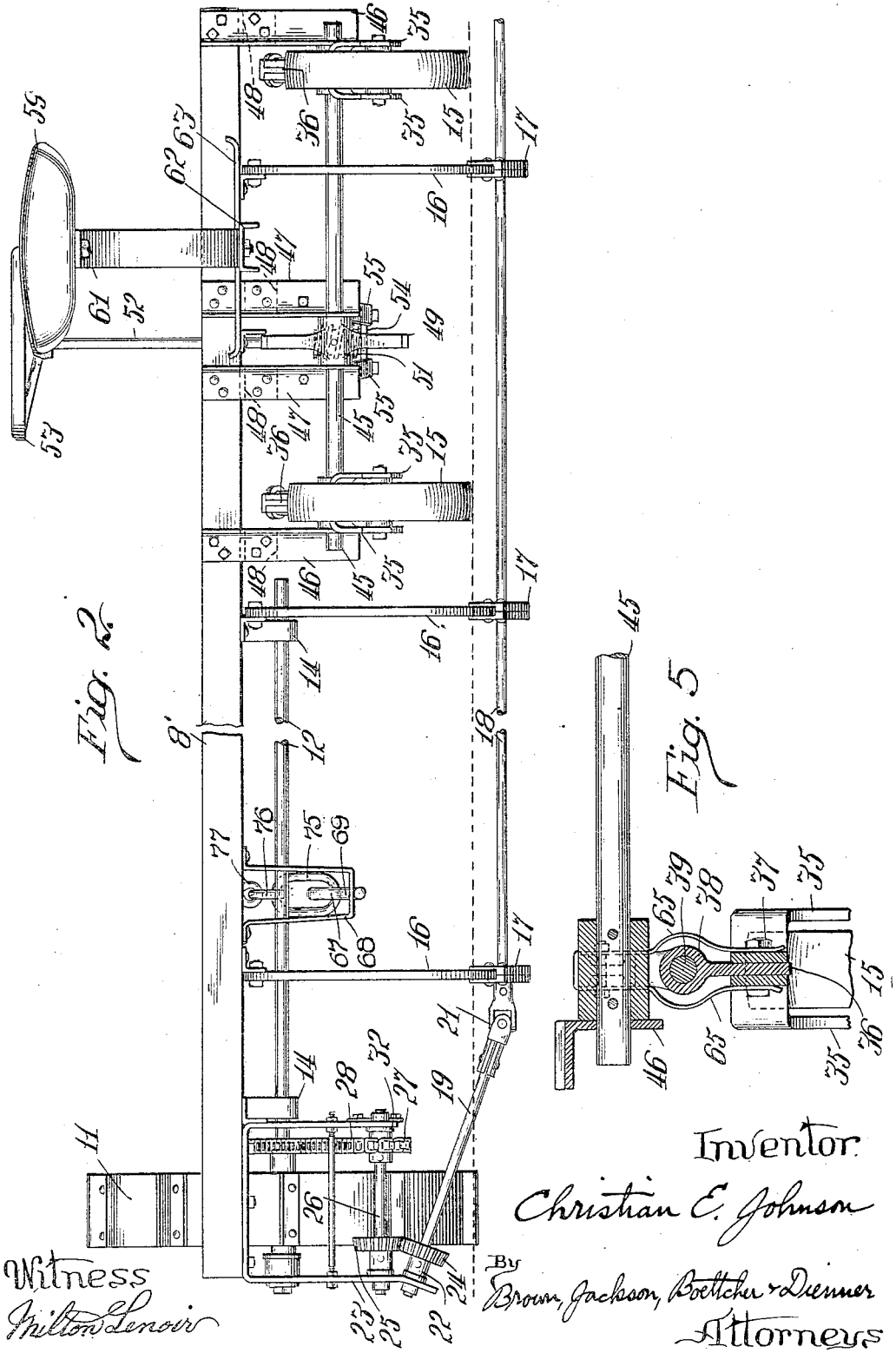
Figure 2 is a rear elevational view of the left-hand side of the weeder, on a larger scale.

The raising and lowering of the rotary rod 18 is effected by raising or lowering the rear portion of the main frame through fore and aft swinging motion of wheel supporting means adjacent to the rear of the frame. Preferably, said wheel supporting means comprises the two caster wheels 15, which are spaced apart to give lateral stability to the rear portion of the frame, although it will be understood that a single caster wheel may be employed if desired. Each wheel is mounted between the arms of a yoke 35. Referring to Figure 5, the two sections of each yoke extend upwardly along opposite sides of a plate 36 to which they are rigidly secured, as by the bolts 37. Said plate is formed with a long bearing hub 38, which is rotatably mounted on a bearing pin 39. The hub engages between upper and lower bearing hubs 41, 41, formed as the extending parts of a U-shaped mounting member 42, the bearing pin 39 extending through the hubs 41, 41. The contacting ends of the hubs 38 and 41 are formed with cooperating radial flanges 43 and 43', which increase the area of thrust bearing surface between the hubs, the flange 43 on the upper end of the hub 38 being preferably extended to the outer edge of the plate on each side thereof to form shoulders against which the upper ends of the yoke sections 35 abut. The U-shaped mounting member 42 of each caster wheel is mounted fast upon the adjacent end portion of a transversely extending shaft 45. Referring to Figure 2, said shaft has bearing support at its outer ends in two angle bar brackets 46 and has bearing support at the intermediate portion thereof in two closely spaced angle bar brackets 47. Both pairs of brackets are secured to the vertical flange of the rear frame bar 8' and are reenforced in their attachment thereto by angle shaped brace members 48 (Figure 3), which are secured to the frame bar and to the brackets.

Non-rotatably secured to the shaft 45, between the central brackets 47, is a worm sector 49. Meshing therewith is a worm 51, which is mounted on a vertical post or shaft 52, having a hand wheel 53 secured to its upper end. Said shaft has bearing support above the worm 51 in one of the longitudinally extending frame bars 9, and has bearing support at its lower end in a step bearing 54. The latter is secured to supporting bars 55, which are fastened to the front sides of the brackets 47. A rod 56 extends forwardly from the bearing 54 and has its threaded front end passing through an angle bracket 57, secured to the frame bar 9, said threaded end receiving nuts 58 on opposite sides of the bracket 57, by which the rod is secured to the bracket and may be adjusted fore and aft for obtaining a proper mesh between the worm 51 and worm sector 49.

It will be evident that rotation of the hand wheel 53 will be operative to oscillate the shaft 45 and thereby swing both caster wheels 15 forwardly or rearwardly with respect to the frame. In swinging forwardly, said wheels operate with a crank motion to force the rear portion of the frame upwardly around the axes of the two front wheels 11, 11', thereby raising the rotary rod 18. Owing to the large mechanical advantage of the worm mechanism 49, 51, this forward swinging of the caster wheels can be performed very easily by the operator, so that there is no difficulty in raising the rotary rod out of the ground under any soil conditions. It should also be noted that the rod will remain at any fixed point of adjustment, owing to the irreversible action of the worm gear mechanism 49, 51.

Referring to Fig. 3 in which the parts are shown in the positions they occupy when the rotary rod is in operative position below the ground surface, owing to the inclination of the bearing pin 39 and hub 38 of the mounting means for the wheel 15 said wheel will have practically no castering movement, and at this time castering movement is not necessarily essential. When the rotary rod is raised to transport position, however, it is essential to the proper operation of the implement that the wheel 15 have castering movement, and it will be readily apparent that as the bearing pin 39 and hub 38 are swung from the position shown in said figure toward a vertical position in the raising of the rod, the castering characteristic of said wheel will increase with such movement, and that when said pin and hub assume an approximately vertical position, which is the position they occupy when the rod is raised to transport position, said wheel will be free to caster completely, except as it may be limited in such castering movement by means that will be hereinafter described.

The operator's seat 59 is preferably disposed in convenient proximity to the hand wheel 53, the seat spring 61 being secured to the rear portion of a channel bar 62, extending forwardly and secured to the under sides of the two transverse frame bars 8 and 8'. A foot rest 63 may also be secured to this channel bar. If desired, provision may be made for shifting the seat spring 61 and foot rest 63 backwardly or forwardly along the bar 62, consisting in providing a series of holes in said bar for receiving the bolts which secure the seat spring and foot rest thereto.

Referring again to Figure 5, it will be seen that a U-shaped flat metal spring 65 is secured to embrace the forward portion of the mounting member 42, with the side portions of said spring bowed outwardly around the bearing hub 38 and thence extending rearwardly to contact with the opposite sides of the caster wheel yoke 35. Each spring arm yieldingly resists swinging movement of the yoke in that direction. When using the implement in hard ground, it is frequently the practice to raise the caster wheels 15 entirely off the ground, in order to impose the weight of the rear end of the implement and of the caster wheels upon the rotary rod for forcing or holding the same down in the ground. At such times, it is desirable that the caster wheels be prevented from falling to either side around their castering axes and thereby striking and dragging cross-wise on the ground. The resilient spring arms 65 serve this purpose by holding the caster wheels in rearwardly extending positions when said wheels are elevated above the ground. I have also found that this construction avoids wobbling or undue play of the caster wheels when the latter are rolling on the ground during the weeding operation, making for better guidance of the implement.

Moreover, when the rotary rod is elevated clear of the ground in transport position, such spring means prevents either caster wheel from swinging around to the point where it might strike or become jammed against some other portion of the implement. The resiliency of the spring arms 65 is such, however, that the caster wheels can caster the desired amount when the implement is being turned. It will be noted that this spring guiding means is effective in all of the raised and lowered positions of the rotary rod.

Draft is transmitted to the implement through two draft rods 67 and 67', which connect with the rear portion of the implement frame at points adjacent to the sides thereof. Referring to Figures 2 and 4, the hitch point between each of said rods and the frame is at a U-shaped stirrup or bracket 68, which is rigidly secured to and extends downwardly from the transverse rear frame bar 8'. The rear end of each draft rod has a downwardly and rearwardly bent hook formation 69, which is passed through an aperture 71 in the bottom of the stirrup 68. This connection between the off-set portion 69 and the aperture 71 affords a hitch point which does not weaken the draft rod and which permits the desired pivotal movement in horizontal and vertical planes between the draft rod and the implement frame. The front end of each rod is formed with in eye 72 to which is linked a section of chain 73 extending forwardly to a clevis or other suitable coupling device 74 for connection with the teams or with a tractor. The front portion of each draft rod preferably has suspension mounting in a long link 75, which is connected through a short link 76 with an eye bolt 77. The shank portion of said eye bolt extends upwardly through a hole in the transverse front frame bar 8 and receives a nut 78 on the upper side thereof Provision may be made for bringing the front ends of the draft connections together at the front of the implement for connection to a tractor. This consists in providing secondary holes 79 (Figure 1) in the frame bar 8 at points located closer to the center of the implement, which secondary holes are adapted to receive the eye bolts 77. It will be noted that when said bolts are placed in the latter holes, the draft rods 67 and 67' are swung inwardly at an angle to the frame, so as to bring the two coupling devices 74 into proximity to each other at the front of the implement, as indicated in dotted lines.

Attention is directed to the fact that the hitch or draft point 69 is disposed below the axes of the side wheels 11, 11' and in rear thereof when the rotary rod 18 is in operative position in the ground; also that this hitch point is substantially directly above the rotary rod at this time. Thus, the draft forces are applied at a point which is located between the wheel axis and the rotary rod. The resistance of the rod to movement in the ground constitutes the principal part of the load and it will be observed that the reacting force arm extending from the rotary rod to the hitch point tends to swing forwardly and downwardly around the rod as an axis under the draft pull which moment arm operates to hold the side wheels 11, 11' pressed downwardly against the ground, whereby the traction wheel 11 maintains effective traction grip for driving the rotary rod under all soil conditions. Conversely, it will be observed that the draft pull acts through a force arm tending to swing downwardly and forwardly around the axis of the wheels 11, 11', thereby tending to press the rotary rod 18 down into the soil, which facilitates the operation of getting the rod down into the ground and also aids in maintaining the same at the desired depth of penetration.

If the rod has any tendency to penetrate down to an undesirable depth, such may be prevented by adjusting the position of the caster wheels 15 through the hand wheel 53, to hold the frame and rod at a fixed point vertically.

What I claim is:

1. In a rotary rod weeder, the combination of a frame, a pair of supporting wheels disposed adjacent to the sides of said frame, a transversely extending rotary rod supported by said frame and adapted to penetrate the ground, means for driving said rotary rod, a wheel mounting member supported on said frame for fore and aft swinging movement for raising and lowering said frame, a caster wheel swivelled on said mounting member for lateral swinging movement, the castering characteristic of said wheel increasing with the raising of said frame, a worm wheel sector operatively connected with said mounting member, a worm meshing with said sector, means for revolving said worm, and means for adjusting said worm relatively to said worm sector.

2. In a rotary rod weeder, the combination of a frame, a pair of supporting wheels disposed adjacent to the sides of said frame, a transversely extending rotary rod supported by said frame and adapted to penetrate the ground, means for driving said rotary rod, a transversely extending shaft mounted on the rear portion of said frame, wheel mounting members carried by said shaft and swinging longitudinally with the oscillatory movement of said shaft for raising and lowering said frame, a pair of caster wheels supported on said mounting members for lateral swinging movement, the tendency of said wheels to caster increasing with the raising of said frame, a worm wheel sector mounted on said shaft, a worm meshing with said sector, means for rotating said worm, and means for adjusting said worm relatively to said worm sector.

3. In a rotary rod weeder, the combination of a frame, a pair of supporting wheels therefor disposed adjacent to the sides of said frame, a transversely extending rotary rod supported by said frame and adapted to penetrate the ground, means for driving said rotary rod, a transversely extending shaft mounted on the rear portion of said frame, U-shaped mounting members secured to the end portions of said shaft, yokes swivelled between the arms of said mounting members for lateral swinging movement, caster wheels mounted in each of said yokes, a worm wheel sector secured to an intermediate portion of said shaft, a worm meshing with said sector, and means for rotating said worm.

4. In a rotary rod weeder, the combination of a frame, a transversely extending rotary rod carried by said frame and adapted to penetrate the ground, means for driving said rotary rod, supporting wheels for said frame comprising a caster wheel, and means for normally holding said caster wheel in position for forward travel in a straight line.

5. In a rotary rod weeder, the combination of a frame, a transversely extending rotary rod carried by said frame and adapted to penetrate the ground, means for driving said rotary rod, supporting wheels for said frame comprising a caster wheel, and means yieldingly resisting lateral swinging movement of said caster wheel.

6. In a rotary rod weeder, the combination of a frame, a transversely extending rotary rod carried by said frame and adapted to penetrate the ground, means for driving said rotary rod, supporting wheels for said frame comprising a caster wheel, means for raising and lowering said rod through relative movement between said caster wheel and said frame, and means yieldingly resisting lateral swinging movement of said caster wheel.

7. In a rotary rod weeder, the combination of a frame, a transversely extending rotary rod carried by said frame and adapted to penetrate the ground, means for driving said rotary rod, supporting wheels for said frame, comprising a caster wheel mounted for fore and aft swinging movement relatively to said frame for raising and lowering said rotary rod, means for effecting such fore and aft movement of said caster wheel, and means yieldingly resisting lateral swinging movement of said wheel in either direction.

8. In a rotary rod weeder, the combination of a frame, a transversely extending rotary rod carried by said frame and adapted to penetrate the ground, means for driving said rotary rod, supporting wheels for said frame comprising two rearwardly extending caster wheels, mounting members for each of said wheels permitting fore and aft swinging motion of said wheels relatively to said frame for raising and lowering said rotary rod, means for effecting such swinging movement, and spring means yieldingly limiting lateral swinging movement of each caster wheel in either direction.

9. In a rotary rod weeder, the combination of a frame, a transversely extending rotary rod carried by said frame and adapted to penetrate the ground, means for driving said rotary rod, a pair of supporting wheels for said frame disposed adjacent to the sides thereof, a transversely extending shaft carried by said frame, mounting members mounted on said shaft, yokes swivelled to said mounting members for lateral swinging movement, caster wheels carried by said yokes, means for oscillating said shaft to swing said caster wheels fore and aft, and spring arms carried by said mounting members and engaging with said yokes for yieldably limiting lateral swinging movement of said caster wheels in either direction.

10. In a rotary rod weeder, the combination of a frame, a pair of supporting wheels therefor disposed adjacent to the sides of said frame, a transversely extending rotary rod supported by said frame and adapted to penetrate the ground, means for driving said rotary rod, a ground engaging wheel support for the rear portion of said frame, and draft means having connection with the frame at a hitch point disposed below the horizontal axial plane of said pair of supporting wheels and substantially in the same vertical plane as said rotary rod.

11. In a rotary rod weeder, the combination of a frame, a pair of front supporting wheels disposed adjacent to the sides of said frame, a transversely extending rotary rod supported by said frame and adapted to penetrate the ground, means for driving said rotary rod, a wheel support for the rear portion of said frame, and two draft devices having connection with said frame at transversely spaced hitch points, disposed substantially in the vertical plane of said rotary rod.

12. In a rotary rod weeder, the combination of a frame, a pair of front supporting wheels for said frame, a transversely extending rotary rod supported by said frame and adapted to penetrate the ground, means for driving said rotary rod, a rear wheel support for the rear portion of said frame, two draft devices disposed adjacent the sides of said frame, suspension means establishing a flexible connection between said draft devices and the forward portion of said frame, and means connecting the rear ends of said draft devices with said frame at hitch points disposed substantially in the vertical plane of said rotary rod.

13. In a rotary rod weeder, the combination of a main frame, a pair of front supporting wheels for said frame, a transversely extending rotary rod supported by said frame and adapted to penetrate the ground, a U-shaped bearing frame secured to said main frame substantially in the transverse plane of said rotary rod, a brace connected between the lower portion of said bearing frame and the forward portion of said main frame, two transverse shafts mounted on said bearing frame, one of said shafts being inclined downwardly and having its lower end coupled to said rotary rod through a universal joint, chain drive mechanism operatively connecting the other of said shafts with one of said supporting wheels, and bevel gears positioned inside of one leg of said bearing frame and operatively connecting said shafts.

14. In a rotary rod weeder, the combination of a frame, a transversely extending rotary rod carried by said frame and adapted to penetrate the ground, means for driving said rotary rod, supporting wheels for said frame, comprising a caster wheel mounted for fore and aft swinging movement relatively to said frame for raising and lowering said rotary rod, worm gear mechanism for effecting such fore and aft movement of said caster wheel, and means yieldingly resisting lateral swinging movement of said wheel in either direction.

15. In a rotary rod weeder, the combination of a frame, a transversely extending rotary rod carried by said frame and adapted to penetrate the ground, means for driving said rotary rod, supporting wheels for said frame, mounting members for each of said wheels permitting fore and aft swinging motion of said wheels relatively to said frame for raising and lowering said rotary rod, worm gear mechanism for effecting such swinging movement, and spring means yieldingly limiting lateral swinging movement of each wheel in either direction.

16. In a rotary rod weeder, the combination of a frame, a transversely extending rotary rod carried by said frame and adapted to penetrate the ground, means for driving said rotary rod, supporting wheels for said frame comprising two rearwardly extending caster wheels, mounting members of each of said wheels permitting fore and aft swinging motion of said wheels relatively to said frame for raising and lowering said rotary rod, worm gear mechanism for effecting such swinging movement, and spring means yieldingly limiting lateral swinging movement of each caster wheel in either direction.

17. In a rotary rod weeder, the combination of a frame, supporting wheels therefor, a transversely extending rotary rod carried by said frame and adapted to penetrate the ground when in operative position, means for driving said rotary rod, one of said wheels being vertically adjustable to govern the depth of penetration of said rotary rod and to move said rod to transport position, and means including a pivot axis disposed between a vertical position and a rearwardly extending horizontal position connecting said wheel with said frame whereby when said rod is moved to transport position said wheel will support said frame and have castering movement relative thereto, and mechanism for adjusting said latter wheel.

18. In a rotary rod weeder, the combination of a frame, supporting wheels therefor, a transversely extending rotary rod carried by said frame and adapted to penetrate the ground, means for driving said rotary rod, one of said wheels having fore and aft swinging movement relative to said frame for raising and lowering said rod, said wheel being mounted on said frame on an axis disposed between a vertical position and a rearwardly extending horizontal position whereby when said rod is raised to transport position said wheel will support said frame and have castering movement relative thereto, and worm gear mechanism for effecting said fore and aft movement of said wheel.

19. In a rotary rod weeder, the combination of a frame, supporting wheels therefor, a transversely extending rotary rod carried by said frame and adapted to penetrate the ground, means for driving said rotary rod, one of said supporting wheels being mounted for fore and aft swinging movement relatively to said frame for raising and lowering said rotary rod, said wheel being supported with respect to said frame on an axis disposed between a vertical position and a rearwardly extending horizontal position whereby when said rod is raised to its uppermost position said wheel will support said frame and have castering movement relative thereto, and manually operable means for effecting such fore and aft movement of said latter wheel.

20. In a rotary rod weeder, the combination of a frame, supporting wheels therefor, a transversely extending rotary rod carried by said frame adapted to penetrate the ground when in operative position, means for driving said rotary rod, one of said wheels being vertically adjustable relative to the frame to govern the depth of penetration of said rotary rod and to move said rod to transport position, and means connecting said latter wheel with said frame whereby the pivot axis of said wheel occupies a vertical position when said rod is in transport position and a downwardly and rearwardly inclined position when said rod is in operative position.

21. In a rotary rod weeder, the combination of a frame, a pair of supporting wheels disposed adjacent the sides of said frame, a transversely extending rotary rod supported by said frame and adapted to penetrate the ground, means for driving said rotary rod, manually operable means for raising and lowering said rod, a wheel mounting member connected with said manually operable means and movable thereby, and a supporting wheel operatively connected with said mounting member, said mounting member holding said wheel in position for castering movement when said rod is raised and moving said wheel to non-castering position when said rod is lowered.

22. In a rotary rod weeder, the combination of a frame, a pair of supporting wheels disposed adjacent to the sides of said frame, a transversely extending rotary rod supported by said frame and adapted to penetrate the ground, means for driving said rotary rod, a caster wheel for the rear end portion of said frame, means for connecting said caster wheel with said frame for fore and aft movement to raise and lower said frame, said means comprising a transversely extending shaft rotatably mounted on said frame, a U-shaped member secured to said shaft to rotate therewith, a yoke member between the arms of which said wheel is rotatably mounted, a plate comprising a bearing sleeve connected with said yoke, and means connecting said plate with said U-shaped member whereby said plate will be moved bodily with said member and have lateral swinging movement relative thereto, and means for rotating said transversely extending shaft.

23. In a rotary rod weeder, the combination of a frame, a pair of supporting wheels disposed adjacent to the sides of said frame, a transversely extending rotary rod supported by said frame and adapted to penetrate the ground, means for driving said rotary rod, a transversely extending shaft mounted on the rear portion of said frame, a wheel mounting member carried by said shaft and swinging longitudinally with the oscillatory movement of said shaft for raising and lowering said frame, said mounting member comprising a U-shaped member secured to said shaft, a bearing pin carried by said U-shaped member, a bearing hub mounted on said bearing pin for lateral swinging movement, and a caster wheel secured to said bearing hub, and means for rotating said shaft.

24. In a rotary rod weeder, the combination of a frame, a pair of supporting wheels disposed adjacent to the sides of said frame, a transversely extending rotary rod supported by said frame and adapted to penetrate the ground, means for driving said rotary rod, a transversely extending shaft mounted on the rear portion of said frame, a wheel mounting member carried by said shaft and swinging longitudinally with the oscillatory movement of said shaft for raising and lowering said frame, said mounting member comprising a U-shaped member secured to said shaft, bearing hubs on the arms of said member, a bearing pin carried by said member and extending between said bearing hubs, a bearing hub mounted on said bearing pin between said first-mentioned hubs for lateral swinging movement, and a caster wheel secured to said last-mentioned bearing hub, and means for rotating said shaft.

25. In a rotary rod weeder, the combination of a frame, a pair of front supporting wheels for said frame, a transversely extending rotary rod supported by said frame and adapted to penetrate the ground, means for driving said rotary rod, a wheel support for the rear portion of said frame, a pair of laterally spaced U-shaped brackets extending downwardly from the rear portion of said frame substantially in the vertical plane of said rotary rod, and a draft rod pivotally connected with each of said brackets for horizontal and vertical movement relative thereto.

26. In a rotary rod weeder, the combination of a frame, a pair of supporting wheels for said frame, a transversely extending rotary rod supported by said frame and adapted to penetrate the ground, means for driving said rotary rod, a pair of laterally spaced stirrups extending downwardly from the rear portion of said frame substantially in the vertical plane of said rotary rod and provided with apertures in the intermediate portions thereof, and draft rods having offset portions engaging in said apertures whereby said draft rods have horizontal and vertical movement relative to said stirrups.

27. In a rotary rod weeder, the combination of a frame, supporting means therefor, a rotary rod supported by said frame and adapted to penetrate the ground, a fore and aft extending draft member having draft attaching means at its forward end and a lateral offset forming a hook portion having an end extending rearwardly, and a bracket secured to the frame and providing a connection to receive said rearwardly extending end and said hook portion, said connection lying substantially in the vertical plane of the rotary rod and below the connection between said supporting means and the frame.

28. In a rotary rod weeder, the combination of a main frame, a pair of front supporting wheels for said frame, a transversely extending rotary rod supported by said frame and adapted to penetrate the ground, a U-shaped bearing frame secured to said main frame substantially in the transverse plane of said rotary rod, two transverse shafts mounted on said bearing frame, one of said shafts being inclined downwardly and having its lower end coupled to said rotary rod through a universal joint, chain drive mechanism operatively connecting the other of said shafts with one of said supporting wheels, and bevel gears positioned inside one leg of said bearing frame and operatively connecting said shafts.

29. In a rotary rod weeder, the combination of a main frame, a pair of front supporting wheels for said frame, a transversely extending rotary rod supported by said frame and adapted to penetrate the ground, a U-shaped bearing frame secured to said main frame, two transverse shafts mounted on said bearing frame, one of said shafts being inclined downwardly and having its lower end coupled to said rotary rod through a universal joint, chain driving mechanism operatively connecting the other of said shafts with one of said supporting wheels, said chain driving mechanism being positioned inside one leg of said bearing frame, and bevel gears positioned inside the other leg of said bearing frame and operatively connecting said shafts.

In witness whereof, I hereunto subscribe my name this 28th day of September, 1928.

CHRISTIAN E. JOHNSON.